(12) United States Patent
Michaels et al.

(10) Patent No.: US 10,414,515 B2
(45) Date of Patent: Sep. 17, 2019

(54) AIRCRAFT AND DEPLOYABLE VISION SYSTEMS FOR AIRCRAFT

(71) Applicant: Gulfstream Aerospace Corporation, Savannah, GA (US)

(72) Inventors: Charles Michaels, Savannah, GA (US); Michael Knight, Savannah, GA (US); Douglas Klutzke, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 56 days.

(21) Appl. No.: 15/359,987

(22) Filed: Nov. 23, 2016

(65) Prior Publication Data
US 2018/0141678 A1    May 24, 2018

(51) Int. Cl.
| | | |
|---|---|---|
| *B64D 47/08* | (2006.01) | |
| *B64D 11/06* | (2006.01) | |
| *H04N 5/225* | (2006.01) | |
| *H04N 5/232* | (2006.01) | |
| *H04N 7/18* | (2006.01) | |
| *B64C 1/14* | (2006.01) | |
| *B64D 43/00* | (2006.01) | |
| *B64C 25/10* | (2006.01) | |

(52) U.S. Cl.
CPC .............. *B64D 47/08* (2013.01); *B64C 1/14* (2013.01); *B64D 11/0689* (2013.01); *B64D 43/00* (2013.01); *H04N 5/2252* (2013.01); *H04N 5/2253* (2013.01); *H04N 5/23203* (2013.01); *H04N 5/23293* (2013.01); *H04N 7/183* (2013.01); *B64C 25/10* (2013.01)

(58) Field of Classification Search
CPC ................................. B64D 47/00; B64D 41/00
See application file for complete search history.

(56) References Cited

U.S. PATENT DOCUMENTS

| | | | | |
|---|---|---|---|---|
| 3,574,283 A | * | 4/1971 | Albers ...................... | G01S 1/02 340/980 |
| 4,516,158 A | * | 5/1985 | Grainge ............... | G01C 11/025 250/334 |
| 4,832,287 A | * | 5/1989 | Werjefelt .................. | B60R 1/00 244/118.5 |
| 4,840,465 A | * | 6/1989 | Loy ........................ | G02B 13/10 359/629 |

(Continued)

OTHER PUBLICATIONS

NPL Google Search (Year: 2019).*

(Continued)

*Primary Examiner* — Luis Perez-Fuentes
(74) *Attorney, Agent, or Firm* — LKGlobal | Lorenz & Kopf LLP

(57) ABSTRACT

Aircraft, vision sensor systems, and methods of operating deployable vision systems are provided. An aircraft includes a fuselage and a vision sensor system. The fuselage defines an outer mold line and the vision sensor system includes a housing and a vision sensor package. The housing is selectively deployable between a retracted position and a deployed position and is disposed within the outer mold line in the retracted position and outside of the outer mold line in the deployed position. The vision sensor package is associated with the housing and is positioned to collect imaging information when the housing is in the deployed position.

19 Claims, 3 Drawing Sheets

(56) References Cited

U.S. PATENT DOCUMENTS

| | | | | |
|---|---|---|---|---|
| 5,015,083 A * | 5/1991 | Wurst | ................... | B64D 47/00 |
| | | | | 359/630 |
| 5,119,236 A * | 6/1992 | Fong | ..................... | B64D 41/00 |
| | | | | 359/630 |
| 10,040,547 B1 * | 8/2018 | Pedigo | ................. | B64C 39/024 |
| 2009/0152391 A1 * | 6/2009 | McWhirk | ................ | B64B 1/02 |
| | | | | 244/30 |
| 2017/0152060 A1 * | 6/2017 | Morisawa | .............. | B64C 27/08 |

OTHER PUBLICATIONS

The devlopment of science, surveillance abd commerce in space; Launius; 2012 (Year: 2012).*

Airborne laboratory experiment handbook; NASA; 2010 (Year: 2010).*

* cited by examiner

AIRCRAFT AND DEPLOYABLE VISION SYSTEMS FOR AIRCRAFT

TECHNICAL FIELD

Embodiments of the present invention generally relate to aircraft and deployable vision systems, and more particularly relate to an aircraft with a vision system that deploys outside of, and retracts within, an outer mold line of the aircraft to provide visual representations of an environment to crew members.

BACKGROUND OF THE INVENTION

Conventional aircraft include forward transparent windows in a flight deck located at the front of the aircraft. The forward windows permit a pilot to view the surroundings in which the aircraft is located to assist with taxi and flight operations. These forward windows, however, are typically large and heavy on conventional aircraft. The size of the forward windows is determined by regulatory field of view requirements. Because forward windows are heavy relative to their size, it is desirable to reduce their size or to eliminate forward facing windows altogether and supplement or replace the visual imagery that they provide with images from vision systems.

Conventional vision systems are disposed in a fixed position outside of an outer mold line of the aircraft. Such protrusions increase drag and reduce performance of the conventional aircraft.

While these conventional aircraft are suitable for their intended purposes, it is desirable to provide aircraft and systems that permit reduction of forward window size, reduction of weight, and/or reduced drag compared to conventional aircraft. Other desirable features and characteristics will become apparent from the subsequent summary and detailed description and the appended claims, taken in conjunction with the accompanying drawings and the foregoing technical field and background.

SUMMARY

Various non-limiting embodiments of aircraft and vision sensor systems are disclosed herein.

In a first non-limiting embodiment, an aircraft includes, but is not limited to, a fuselage and a vision sensor system. The fuselage defines an outer mold line and the vision sensor system includes a housing and a vision sensor package. The housing is selectively deployable between a retracted position and a deployed position and is disposed within the outer mold line in the retracted position and outside of the outer mold line in the deployed position. The vision sensor package is associated with the housing and is positioned to collect imaging information when the housing is in the deployed position.

In a second non-limiting embodiment, a vision sensor system for an aircraft includes, but is not limited to, a housing and a vision sensor package. The housing is selectively deployable between a retracted position and a deployed position. The housing is further configured to be disposed within an outer mold line of the aircraft in the retracted position and outside of the outer mold line in the deployed position. The vision sensor package is associated with the housing and is positioned to collect imaging information when the vision sensor system is in the deployed position.

In a third non-limiting embodiment, a method of operating a deployable vision system for an aircraft includes deploying, outside of an outer mold line of the aircraft, a housing and a vision sensor package associated with the housing. The method further includes displaying, on a display, an image of an environment outside of the aircraft based on an output from the vision sensor package.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

The following detailed description is merely exemplary in nature and is not intended to limit the invention or the application and uses of the invention. Furthermore, there is no intention to be bound by any theory presented in the preceding background or the following detailed description.

In a non-limiting embodiment, a vision system for an aircraft is described herein. The vision system replaces or augments a view provided by a window in a fuselage of the aircraft. The vision system deploys and retracts into and out of an outer mold line of an aircraft. In the deployed position, at least one vision sensor collects imaging information that may be used to generate—on a display—an image of the environment around the aircraft. A controller causes the image to be displayed on a pilot display in the aircraft.

Figure 1:
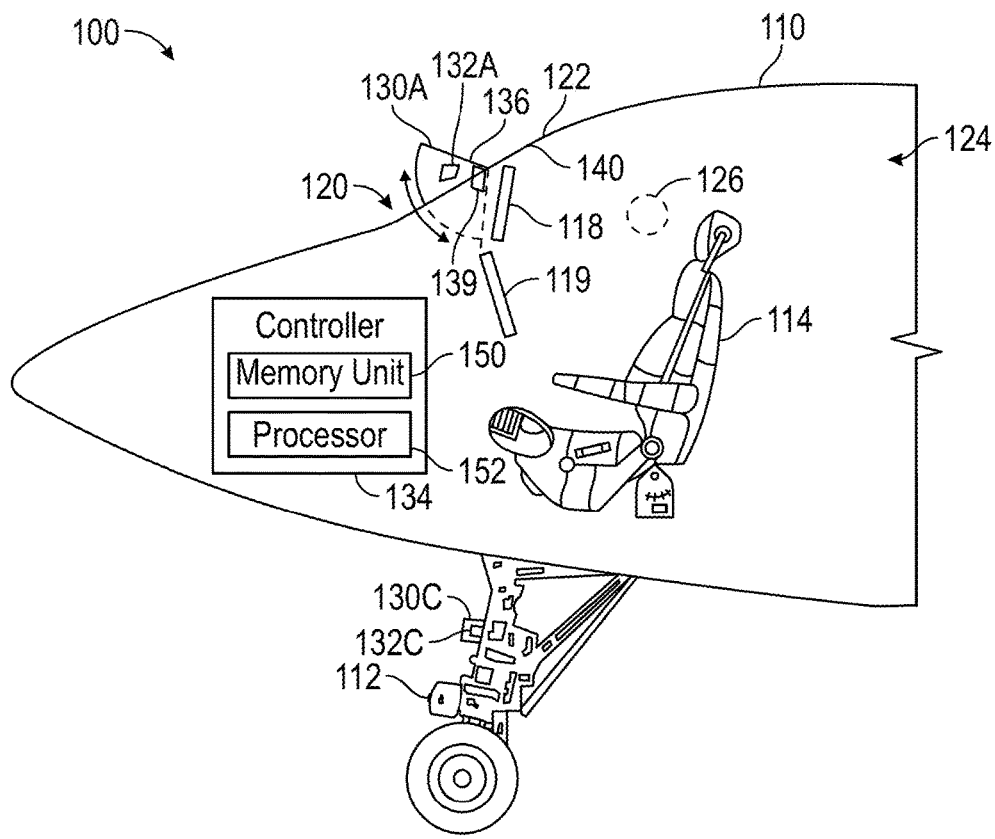
FIG. 1 is a schematic side cutaway view illustrating an aircraft that includes an embodiment of a vision sensor system in accordance with the teachings of the present disclosure.
Figure 2:
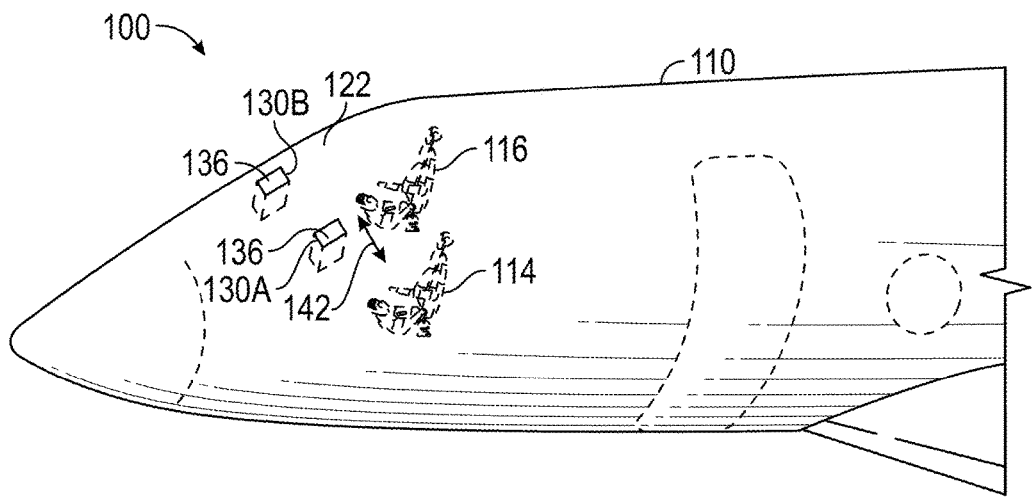
FIG. 2 is an isometric view illustrating an aircraft that includes an embodiment of the vision sensor system in accordance with the teachings of the present disclosure.
Figure 3A:
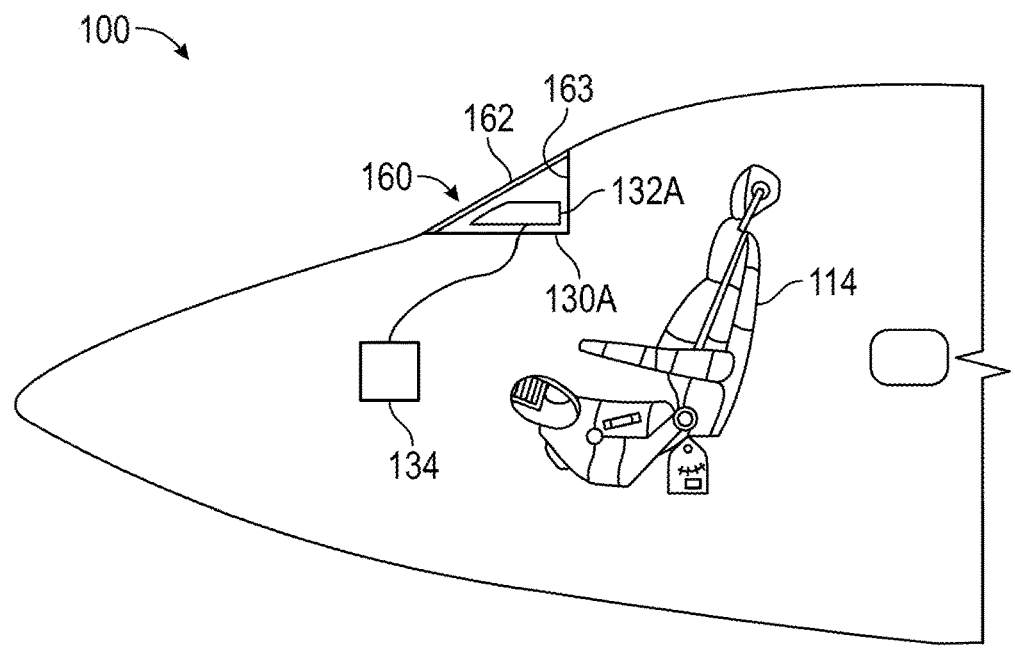
FIGS. 3A and 3B are schematic side cutaway views illustrating a vision sensor system in accordance with the teachings of the present disclosure.
Figure 3B:
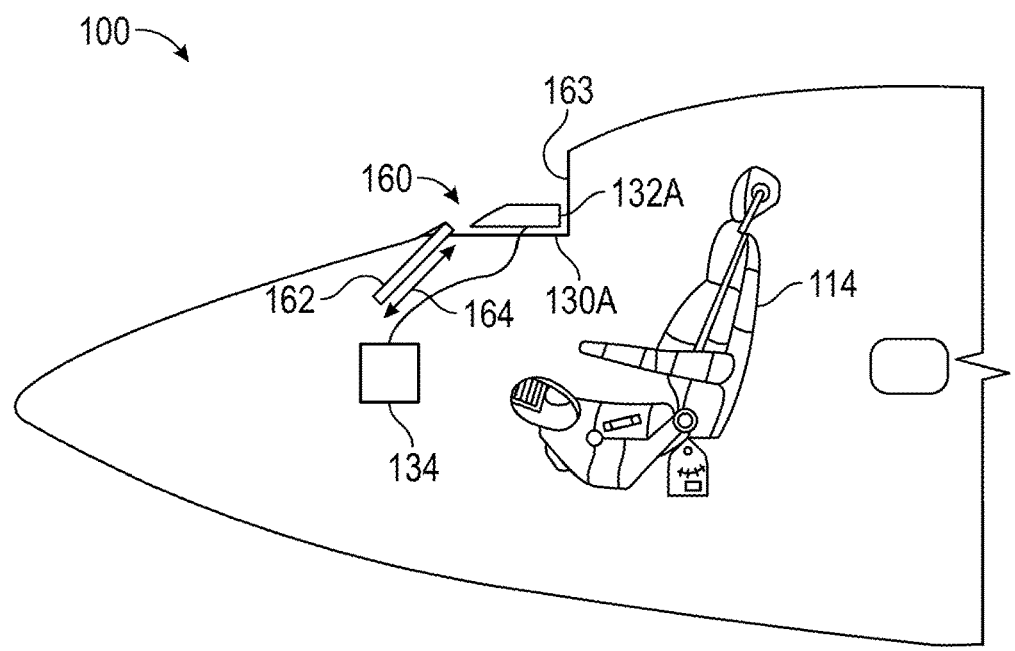

FIG. 1 is a schematic cutaway side view of an aircraft 100 and FIG. 2 is an isometric view of aircraft 100. The teachings of the present disclosure are compatible with all types of aircraft including, but not limited to, private propeller driven aircraft, private jets, commercial jet passenger aircraft, commercial propeller driven passenger aircraft, cargo aircraft, military aircraft, and the like. Aircraft 100 includes a fuselage 110, a landing gear assembly 112, a first pilot seat 114, a second pilot seat 116, an upper display 118, a lower display 119, and a vision sensor system 120.

Fuselage 110 generally includes a frame structure (not numbered) covered by an opaque aircraft skin 122. Fuselage 110 defines an outer mold line and encloses a flight deck 124 that defines a design eye point 126 of a pilot. As used herein, the outer mold line is defined by the wetted area of aircraft 100 in contact with external airflow at cruise conditions with the vision sensor system retracted.

Opaque aircraft skin 122 defines the outer surface of fuselage 110 and may be any suitable aircraft skin material, such as aluminum or composite material. In the example provided, opaque aircraft skin 122 is disposed forward of the design eye point with respect to the aircraft. The design eye point is the location where a pilot's eyes are expected to be while flying aircraft 100 as defined by seat location and other factors, as will be appreciated by those with ordinary skill in the art. In the example provided, a pilot in first pilot seat 114 looking in the forward direction of flight of aircraft 100 is not able to see out of aircraft 100 because at least opaque aircraft skin 122 is obstructing forward vision. In other words, in the embodiment provided, aircraft 100 does not include a forward flight deck window. Such a windowless configuration may be advantageous for weight savings by eliminating the heavy glass window typically used on conventional aircraft for a flight deck window. The windowless configuration may also be advantageous for aircraft configurations having highly elongated front portions of fuselage 110 where forward vision through a glass window is greatly impaired by internal reflections and refraction. In some embodiments, aircraft 100 does include a forward window and opaque aircraft skin 122 is not disposed in front of design eye point 126. In some embodiments, aircraft 100 includes side flight deck windows for lateral vision while omitting forward windows. In some embodiments, aircraft 100 includes forward flight deck windows with reduced size compared with conventional aircraft.

Landing gear assembly 112 extends and retracts wheeled assemblies for takeoff and landing, as will be appreciated by those with ordinary skill in the art. The illustrated landing gear assembly 112 is a nose gear assembly located at a forward portion of fuselage 110. It should be appreciated that landing gear assembly 112 may be part of main landing gear (not illustrated) and may be located at other portions of fuselage 110 without departing from the scope of the present disclosure.

First pilot seat 114 and second pilot seat 116 provide seating for a first pilot and a second pilot in flight deck 124. The locations of first pilot seat 114 and second pilot seat 116 at least partially define the location of design eye point 126.

Upper display 118 and lower display 119 provide flight information as well as images representing an environment in front of aircraft 100, as will be described below with reference to FIG. 4. In the example provided, upper display is disposed in front of design eye point 126 where a pilot would generally look through a window on a conventional aircraft.

Vision sensor system 120 replaces or augments natural forward vision for the first pilot and/or the second pilot. Vison sensor system 120 is selectively deployable between a retracted position and a deployed position in which housings and sensors of vision sensor system are retracted or deployed. Vision sensor system 120 includes a first housing 130A, a first vision sensor package 132A, a second housing 130B, a second vison sensor package 132B, a third housing 130C, a third vision sensor package 132C, and a controller 134.

In a non-limiting embodiment, housings 130A-C are weatherproof casings that enclose sensor packages 132A-C. Housings 130A-B each includes outer surface 136 that lie flush with the outer mold line of fuselage 110 when vision sensor system 120 is in the retracted position. Housings 130A-B are disposed in an upper portion of the fuselage and are positioned substantially directly in front of design eye point for the respective pilot. For example, Housing 130A is associated with a design eye point for first pilot seat 114 and housing 130B is associated with a design eye point for second pilot seat 116. In some embodiments, housings 130A-C are disposed as close to the respective design eye point as possible to minimize parallax, as will be appreciated by those with ordinary skill in the art. Housing 130C is disposed in a lower portion of fuselage 110 and is secured to the landing gear assembly. Accordingly, housing 130C is deployable with the landing gear assembly. As used herein, the partition between the upper and lower portion of fuselage 110 is defined by a horizontal plane through a center of a nose cone of aircraft 100 when aircraft 100 is at rest.

Housings 130A-B may deploy and retract by any suitable mechanism. For example, housing 130A illustrated in FIG. 1 deploys and retracts by an actuator 139 rotating housing 130A about a rotation axis 140. The example illustrated in FIG. 2 deploys and retracts by translating housing 130A along axis 142. It should be appreciated that other mechanisms and movements may be incorporated without departing from the scope of the present disclosure. Housing 130C is fixed to landing gear assembly 112 to deploy and retract with landing gear assembly 112.

Vision sensor packages 132A-C are associated with their respective housing 130A-C and are positioned to collect imaging information when the vision sensor system is in the deployed position. Imaging information includes any information that may be used to generate an image of the environment around aircraft 100 for use by a pilot to replace or augment natural forward vision through a forward flight deck window. Vision sensor packages 132A-C may include visible spectrum cameras, infrared spectrum cameras, radar sensors, low light cameras, other suitable sensors, or combinations thereof. In the example provided, vision sensor packages 132A-C all include the same number and type of sensors. In some embodiments, vision sensor packages 132A-B and vision sensor packages 132C have different types of sensors. In the example provided, vision sensor package 132A is associated with first pilot seat 114 and second vision sensor package 132B is associated with second pilot seat 116.

In the example provided, vision sensor packages 132A-C are fixed in position. In some embodiments, vision sensor packages may be steerable in azimuth and elevation to provide increased field of view. In some embodiments, multiple sensors having different fields of view are located within each sensor package. In such multiple field of view implementations, the images from each sensor may be stitched together to provide a seamless view. In some embodiments, multiple sensor packages are provided for each pilot to provide redundancy.

Controller 34 is a hardware device that carries out instructions of a computer program, as is well known to those of ordinary skill in the art. Controller 34 is configured to execute the computer program to provide the functions described in FIG. 4. In some embodiments, controller 134 may be configured to provide the functions of a conventional flight management system (FMS) in addition to performing the operations described in FIG. 4. Controller 134 includes one or more memory units 150 that store electronic data and computer programs. For example, memory units 150 may be flash memory, spin-transfer torque random access memory (STT-RAM), magnetic memory, phase-change memory (PCM), dynamic random access memory (DRAM), or other suitable electronic storage media. In the example provided, memory units 150 store control logic with instructions that cooperate with a processor 152 of controller 134 to perform operations of the method described below. In some embodiments, processor 152 may include one or more central processing units ("CPUs"), a microprocessor, an application specific integrated circuit ("ASIC"), a microcontroller, and/or other suitable device. Furthermore, controller 134 may utilize multiple hardware devices as is also appreciated by those skilled in the art.

In some embodiments, controller 134 is configured to deploy and retract vision sensor system 120 based on an altitude of aircraft 100. For example, controller 134 may be configured to retract the vision sensor system when the altitude exceeds 18,000 feet and to deploy the vision sensor system 120 when the altitude drops below 18,000 feet. In other embodiments, controller 134 may be configured to receive an input from members of an aircrew and to control deployment and retraction of vision sensor system 120 based on the input. Controller 134 is further configured to generate a signal that causes a display to present the imaging information as an image of an environment in which aircraft 100 is located.

With continuing reference to FIGS. 1-2, FIGS. 3A and 3B are schematic side cutaway views illustrating a vision sensor system 160 in accordance with the teachings of the present disclosure. Vision sensor system 160 is similar to vision sensor system 120, where like numbers refer to like components. Vision sensor system 160, however, is deployable by selectively exposing and covering vision sensor packages 132A-B with a movable cover 162. For example, housings 130A-B and vision sensor packages 132A-B may be fixed within cavities 163 at least partially defined by opaque aircraft skin 100 and housings 132A-B.

Movable cover 162 is in a shielding position and is exposed to an air flow around aircraft 100 and lies flush with opaque aircraft skin 122 when vision sensor system 160 is in the retracted position. In the example provided, movable cover 162 includes a frame covered by a skin that is similar to opaque aircraft skin 122. In the deployed position of vision sensor system 160, movable cover 162 moves along a path 164 to move to a deployed positon to expose cavity 163 and vision sensor packages 132A-C to a flow of air around aircraft 100.

Figure 4:
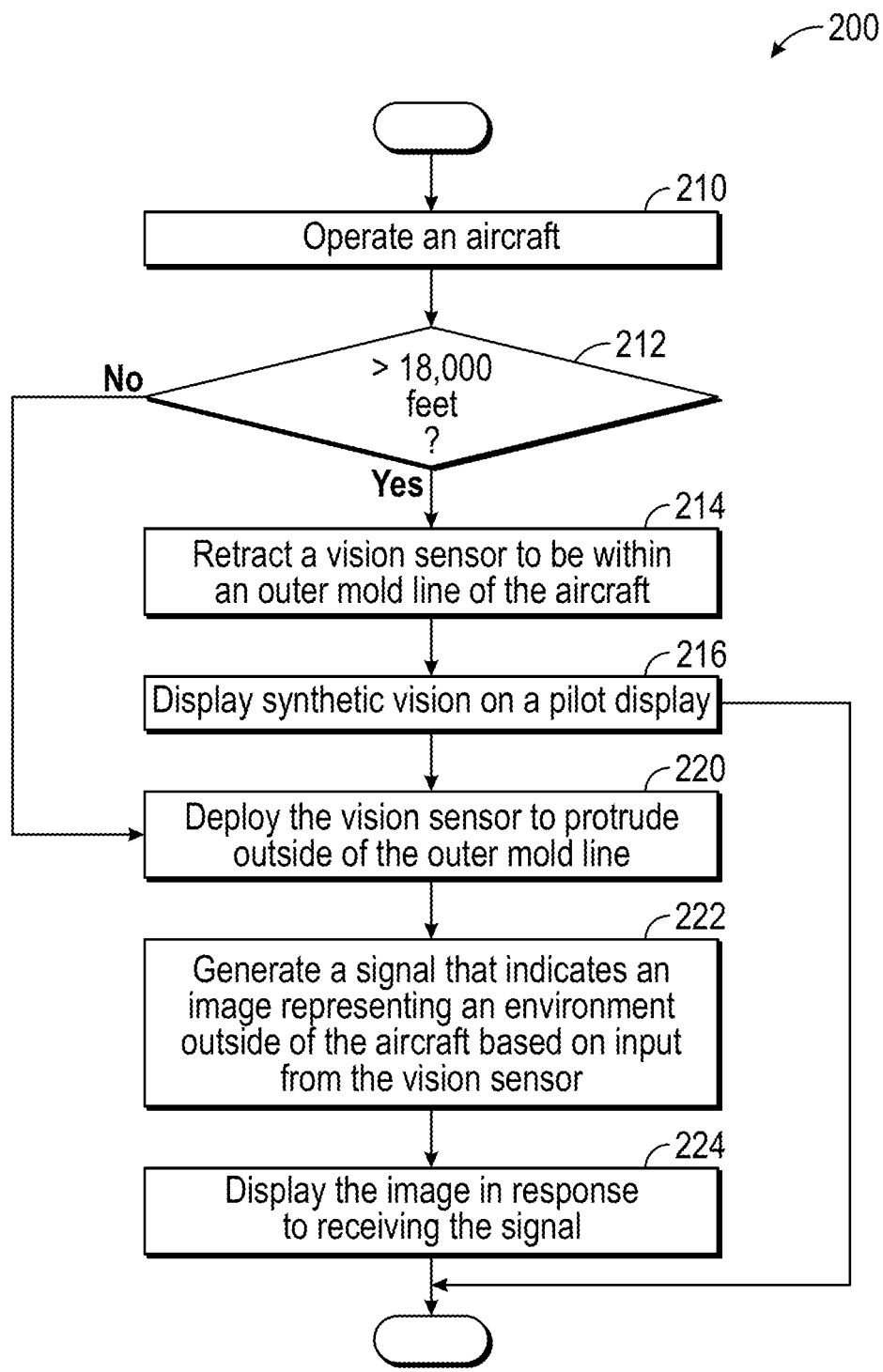
FIG. 4 is flow diagram illustrating a method of operating a deployable vision system for an aircraft in accordance with the teachings of the present disclosure.

With continuing reference to FIGS. 1-2, FIG. 4 is a flow diagram illustrating a method 200 of operating a deployable vision system for an aircraft. In the example provided, method 200 is performed by controller 134. An aircraft is operated in operation 210. For example, aircraft 100 may be in flight.

The controller determines whether the aircraft has crossed 18,000 feet of altitude in operation 212. In the example provided, 18,000 feet is selected because aircraft are generally considered to be operating on instruments without utilizing natural pilot vision above 18,000 feet. It should be appreciated that other altitudes and other deploy/retract criteria may be utilized without departing from the scope of the present disclosure. In some embodiments, the controller may determine whether the aircraft is entering a new phase of flight to determine when to deploy or retract the vision sensor system. For example, the vision sensor system may be deployed during takeoff, approach, and landing phases and may be retracted during the remaining phases of flight.

When the aircraft has exceeded 18,000 feet of altitude, method 200 proceeds to operation 214. The controller retracts a vison sensor to be within an outer mold line of the aircraft in operation 214. For example, controller 134 may rotate or translate housings 130A-B and vision sensor packages 132A-B so that outer surfaces 136 lie flush with the outer mold line of aircraft 100. Similarly, controller 134 may retract landing gear assembly 112 to retract housing 130C and vision sensor package 132C. It should be appreciated that retracting vison sensor system 120 to a retracted position may include retracting only landing gear assembly 112 while housings 130A-B remain deployed, and may include retracting both landing gear assembly 112 and housings 130A-B.

The controller displays synthetic vision or other information to a pilot display in operation 216. Because vision sensor system 120 is retracted, the information presented to the pilot in operation 216 is not collected by vision sensor system 120. For example, synthetic vision may display known topography or previously collected information to display based on a location of aircraft 100 as determined by a global navigation satellite system (GNSS).

When aircraft has dropped below 18,000 feet in operation 212, method 200 proceeds to operation 220. The controller deploys the vision sensor to protrude outside of the outer mold line in operation 220. For example, controller 134 may rotate or translate housings 130A-B and vision sensor packages 132A-B outside of outer mold line of aircraft 100. Similarly, controller 134 may deploy landing gear assembly 112 to deploy housing 130C and vision sensor package 132C. It should be appreciated that deploying vision sensor system 120 to a deployed position may include deploying housings 130A-B while landing gear assembly 112 remains retracted, may include deploying landing gear assembly 112 while housings 130A-B remain retracted, and may include deploying both landing gear assembly 112 and housings 130A-B.

The controller generates a signal that indicates an image of an environment outside of the aircraft based on input from the vision sensor in operation 222. The controller causes a display to display the image in response to receiving the signal in operation 224. For example, controller 134 may generate an image of the environment surrounding aircraft 100 to present to the pilots on upper display 118, lower display 119, or both displays 118 and 119.

In some embodiments, vision sensor packages 132A-B provide the imaging information for presentation on upper display 118 and vision sensor package 132C provides the imaging information for presentation on lower display 119. In some embodiments, vision sensor package 132A-B or 132C providing the imaging information changes based on the altitude or phase of flight of aircraft 100. For example, an image may be generated based on input from vision sensor packages 132A-B during the takeoff phase when a nose of aircraft 100 does not obstruct a view from sensor packages 132A-B. Conversely, an image may be generated based on input from vision sensor package 132C during the landing phase when a view from sensor packages 132A-B is obstructed by the nose of aircraft 100 due to the pitch of aircraft 100, as will be appreciated by those with ordinary skill in the art.

While at least one exemplary embodiment has been presented in the foregoing detailed description, it should be appreciated that a vast number of variations exist. For example, although the disclosed embodiments are described with reference to advanced aircraft vision system for an aircraft, those skilled in the art will appreciate that the disclosed embodiments could be implemented in other types of vehicles including, but not limited to, surface ships, automobiles, trains, motorcycles, etc. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An aircraft comprising:
  a fuselage defining an outer mold line; and
  a vision sensor system comprising;
    a housing selectively deployable between a retracted position and a deployed position, the housing disposed within the outer mold line in the retracted position and outside of the outer mold line in the deployed position,
    a vision sensor package associated with the housing and positioned to collect imaging information when the housing is in the deployed position, and
    a controller configured to deploy and retract the vision sensor system.

2. The aircraft of claim 1, wherein the housing is disposed in an upper portion of the fuselage and includes an outer surface that lies flush with the outer mold line when the housing is in the retracted position.

3. The aircraft of claim 2, wherein the fuselage includes an opaque aircraft skin and encloses a flight deck that defines a design eye point of a pilot, and wherein the opaque aircraft skin is disposed forward of the design eye point with respect to the aircraft.

4. The aircraft of claim 3, wherein the housing is positioned substantially directly in front of the design eye point.

5. The aircraft of claim 1, wherein the housing is disposed in a lower portion of the fuselage.

6. The aircraft of claim 5, further comprising a landing gear assembly, wherein the housing is secured to the landing gear assembly and is deployable with the landing gear assembly.

7. The aircraft of claim 6, wherein the landing gear assembly is a nose gear assembly.

8. The aircraft of claim 1, further comprising a first pilot seat and a second pilot seat, wherein the housing is a first housing associated with the first pilot seat, the vision sensor package is a first vision sensor package associated with the first pilot seat, and wherein the vision sensor system further includes a second housing associated with the second pilot seat and a second vision sensor package associated with the second pilot seat.

9. The aircraft of claim 8, further comprising a landing gear assembly, wherein the vision sensor system further includes a third housing and a third vision sensor package secured to the landing gear assembly.

10. The aircraft of claim 1, wherein the controller is configured to deploy and retract the housing based on an altitude of the aircraft.

11. The aircraft of claim 10, wherein the controller is configured to retract the vision sensor system when the altitude exceeds 18,000 feet and to deploy the vision sensor system when the altitude of the aircraft drops below 18,000 feet.

12. The aircraft of claim 1, wherein the controller is configured to generate a signal that causes a display to present the imaging information as an image of an environment in which the aircraft is located.

13. The aircraft of claim 1, wherein the vision sensor package includes a visible spectrum camera.

14. The aircraft of claim 1, wherein the vision sensor package includes an infrared spectrum camera.

15. The aircraft of claim 1, wherein the vision sensor package includes a radar sensor.

16. The aircraft of claim 1, wherein the vision sensor package includes a low light camera.

17. A vision sensor system for an aircraft, the vision sensor system comprising:
  a housing selectively deployable between a retracted position and a deployed position, wherein the housing is configured to be disposed within an outer mold line of the aircraft in the retracted position and outside of the outer mold line in the deployed position;
  a vision sensor package associated with the housing and positioned to collect imaging information when the housing is in the deployed position, and
  a controller configured to deploy and retract the vision sensor system.

18. The vision sensor system of claim 17, wherein the housing is configured to be disposed in an upper portion of a fuselage and includes a first surface that is configured to lie flush with the outer mold line when the vision sensor system is in the retracted position.

19. A method of operating a deployable vision system for an aircraft, the method comprising:
  deploying, outside of an outer mold line of the aircraft with a controller, a housing and a vision sensor package associated with the housing;
  displaying, on a display, an image of an environment outside of the aircraft based on an output from the vision sensor package.

* * * * *